(12) United States Patent
Piemonte

(10) Patent No.: US 8,965,693 B2
(45) Date of Patent: Feb. 24, 2015

(54) GEOCODED DATA DETECTION AND USER INTERFACES FOR SAME

(75) Inventor: Patrick Piemonte, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/489,405

(22) Filed: Jun. 5, 2012

(65) Prior Publication Data

US 2013/0325318 A1 Dec. 5, 2013

(51) Int. Cl.
*G08G 1/123* (2006.01)

(52) U.S. Cl.
USPC ............................ 701/532; 707/758; 715/712

(58) Field of Classification Search
USPC .......... 701/410, 533, 532; 705/7.11; 345/635; 707/758; 715/712
See application file for complete search history.

(56) References Cited

U.S. PATENT DOCUMENTS

| | | | |
|---|---|---|---|
| 6,934,634 B1 | 8/2005 | Ge | |
| 7,039,640 B2 * | 5/2006 | Miller et al. | 1/1 |
| 7,668,651 B2 * | 2/2010 | Searight et al. | 701/520 |
| 7,685,108 B2 * | 3/2010 | Miller et al. | 707/706 |
| 8,060,582 B2 | 11/2011 | Bliss et al. | |
| 2002/0072379 A1 | 6/2002 | Chen et al. | |
| 2005/0137994 A1 * | 6/2005 | Fortin et al. | 706/45 |
| 2005/0283726 A1 | 12/2005 | Lunati | |
| 2009/0156229 A1 | 6/2009 | Hein et al. | |
| 2009/0326803 A1 * | 12/2009 | Neef et al. | 701/201 |
| 2010/0087230 A1 * | 4/2010 | Peh et al. | 455/566 |
| 2010/0093306 A1 | 4/2010 | Hwang et al. | |
| 2010/0179754 A1 | 7/2010 | Faenger et al. | |
| 2010/0185391 A1 * | 7/2010 | Lee et al. | 701/208 |
| 2011/0029900 A1 * | 2/2011 | Ngo et al. | 715/764 |
| 2011/0256881 A1 * | 10/2011 | Huang et al. | 455/456.1 |
| 2011/0306328 A1 * | 12/2011 | Yonker et al. | 455/415 |
| 2012/0156445 A1 * | 6/2012 | Schmidt et al. | 428/195.1 |

FOREIGN PATENT DOCUMENTS

| | | | | |
|---|---|---|---|---|
| EP | 2434784 A1 * | 10/2007 | | H04W 4/02 |
| EP | 2434784 A1 * | 3/2012 | | |
| GB | 2 416 844 A | 2/2006 | | |
| JP | A 2001-034290 | 2/2001 | | |
| JP | A 2004-341742 | 12/2004 | | |
| WO | 2005/116581 | 12/2005 | | |
| WO | 2011/109751 | 9/2011 | | |

OTHER PUBLICATIONS

Extended European Search Report, dated Aug. 6, 2012, corresponding to European Application No. EP 1366260.3, 6 pages.
Ryuichi Tanaka, Ushio Inoue, Providing Geographic Information to Arbitrary Web Pages, The Institute of Electronics, Information and Communication Engineers, 19th Data Engineering Workshop Proceedings, Japan, IEICE Data Engineering Technical Committee, Apr. 7, 2008 (English translation of abstract only.).

* cited by examiner

*Primary Examiner* — Tuan C. To
*Assistant Examiner* — Isaac Smith
(74) *Attorney, Agent, or Firm* — Fish & Richardson P.C.

(57) ABSTRACT

A system, method and computer-readable medium are disclosed that can detect an address, geographic coordinates or business name in text displayed on a device and geocode or reverse geocode, respectively, the address/business name or geographic coordinates to provide geocoded data. The detecting and geocoding/reverse geocoding can be performed automatically. The geocoded data can be displayed in-place with the text in a user interface of the device or be provided to another application.

14 Claims, 9 Drawing Sheets

US 8,965,693 B2

GEOCODED DATA DETECTION AND USER INTERFACES FOR SAME

TECHNICAL FIELD

This disclosure is related generally to in-place text editing and geocoding.

BACKGROUND

Modern mobile devices (e.g., smart phones, e-tablet computers) include in-place text editing for a variety of text-based applications, such as e-mail and text messages. Users can highlight or otherwise designate portions of text for editing, including cutting, copying, pasting and replacing text. Many of these modern mobile devices are location-aware, and include geocoding and reverse geocoding capability that can be used with a mapping or navigation application. Geocoding is the process of finding associated geographic coordinates (e.g., latitude, longitude) from other geographic data, such as street addresses or postal codes. Reverse geocoding is the process of reverse coding a point location (e.g., latitude, longitude) to a readable address or place name.

SUMMARY

A system, method and computer-readable medium are disclosed that can detect an address, geographic coordinates or business name (e.g., latitude, longitude) in text displayed on a device and geocode or reverse geocode, respectively, the address/business name or geographic coordinates to provide geocoded data. The detecting and geocoding/reverse geocoding can be performed automatically. The geocoded data can be displayed in-place with the text in a user interface of the device or be provided to another application.

In some implementations, text input is received that includes an address that is detected automatically and then modified to display more or less granularity, such as geographic coordinates, city, a commercial venue at the address or any other geocoded data that is available to the device (e.g., census information, social network information, etc.)

In some implementations, in-place detection and modification of an address or geographic coordinates is incorporated into a spell-check or dictionary user interface element (e.g., a call out) in-place on text. The user interface element can suggest other geocoded information related to the address or geographic coordinates (e.g., postal codes, business names, census information, area codes, administrative boundaries, links to government or commercial resources (e.g., links to websites), points of interest, etc.).

In some implementations, an application developer can designate a text field in an application as inheriting the capability to detect addresses or geographic coordinates. The capability can be provided to an application by a system-wide service, for example, by an operating system service of the device according to an Application Programming Interface (API).

Particular implementations disclosed herein provide one or more of the following advantages. Addresses or geographic coordinates can be detected in-place for any text in any application, such as e-mail, text messages or notes. Upon detection, the user can be provided with additional information related to the detected address or geographic coordinates without having to leave the current application.

The details of the disclosed implementations are set forth in the accompanying drawings and the description below. Other features, objects, and advantages will be apparent from the description and drawings, and from the claims.

DESCRIPTION OF DRAWINGS

The same reference symbol used in various drawings indicates like elements.

DETAILED DESCRIPTION

Exemplary User Interfaces

Figure 1A:
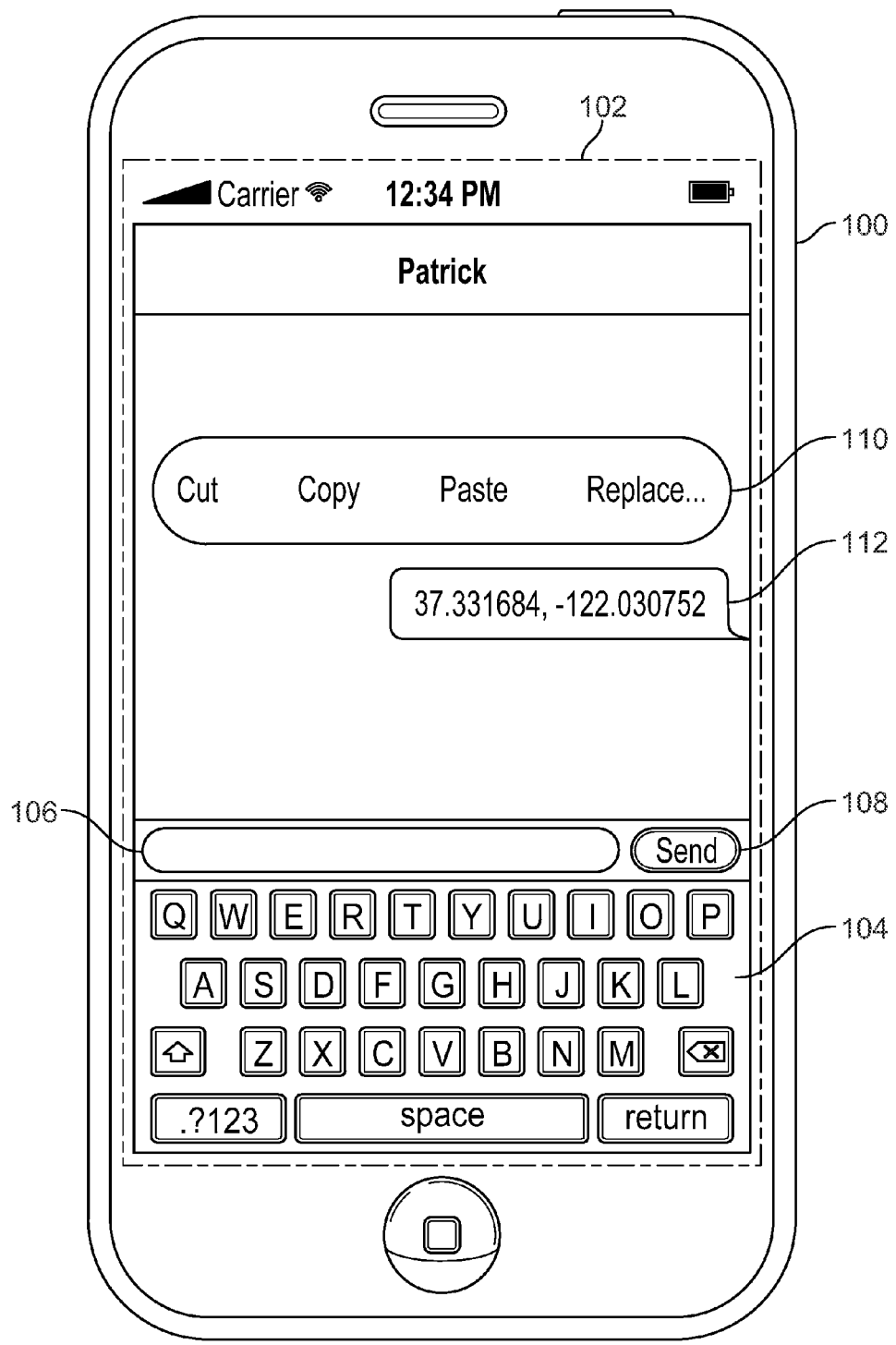
FIGS. 1A and 1B illustrate an exemplary user interface for in-place reverse geocoding.
Figure 1B:
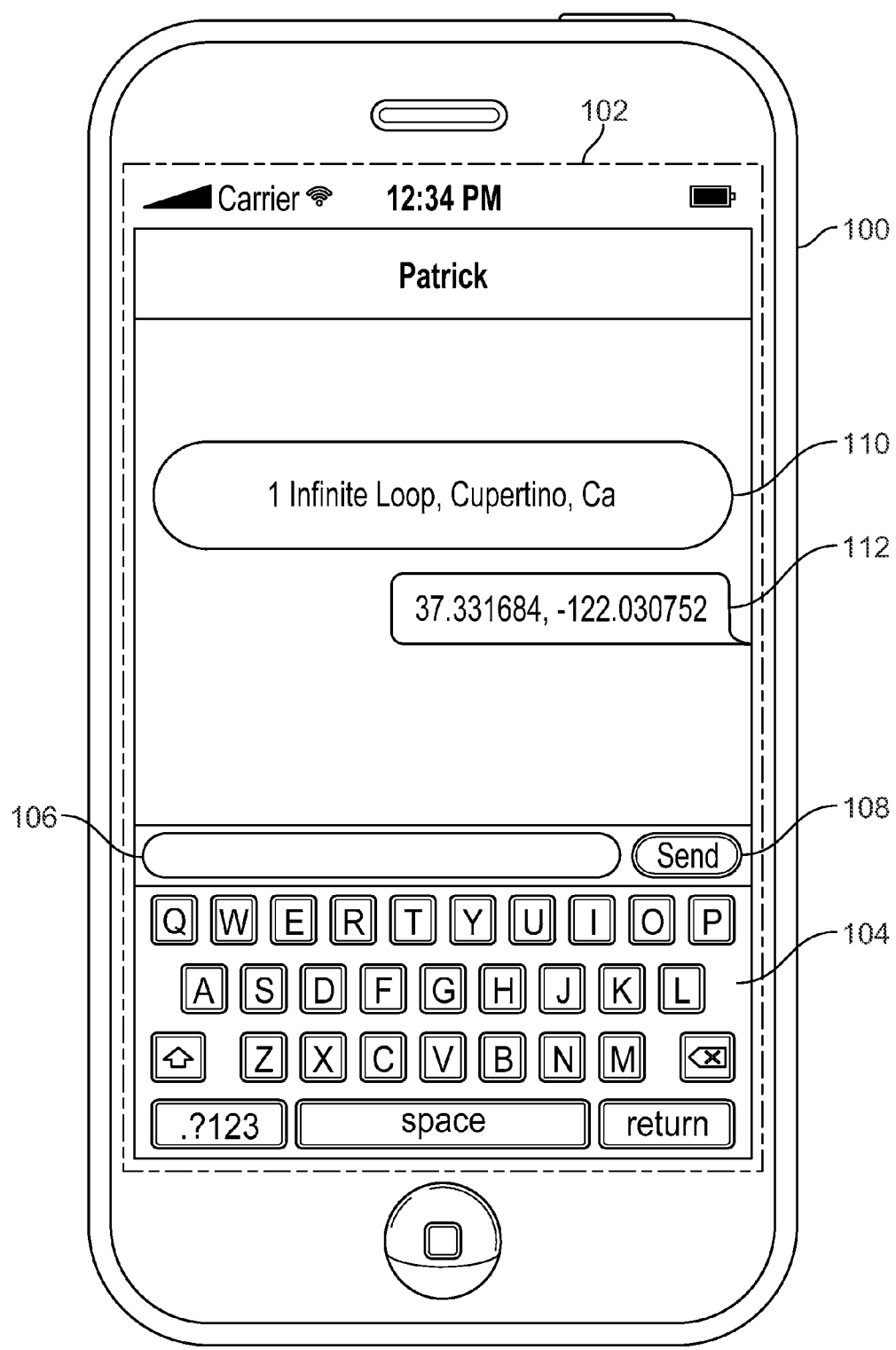

FIGS. 1A and 1B illustrate an exemplary user interface for in-place reverse geocoding. Referring to FIG. 1A, a user interface for a text messaging application is shown. The user interface is presented on touch-sensitive display 102 of mobile device 100. Although device 100 is shown as a smart phone in FIG. 1A, device 100 can be any device capable of displaying text, including but not limited to smart phones, notebook computers, electronic tablet computers, television appliances, e-mail devices, etc. The user interface for text messaging can include virtual keyboard 104, text input field 106 and send button 108.

In the example shown, a user ("Patrick") has received geographic coordinates 112 in a text message. Geographic coordinates 112 can have a format based on International Organization for Standardization (ISO) 6709 standard representation of geographic point location by coordinates, where, for example, a positive latitude indicates northern hemisphere, a minus latitude indicates southern hemisphere, a positive longitude indicates east longitude, and a minus longitude indicates west longitude. Patrick touches (e.g., a long press) or taps on the coordinates to make call out 110 appear. Call out 110 includes several editing options, including cut, copy, paste and replace.

Referring to FIG. 1B, Patrick selects the replace option, resulting in call out 110 displaying the street address, city and state corresponding to the geographic coordinates "37.331684, −122.030752," which is "1 Infinite Loop, Cupertino, Calif." When Patrick selected replace, a reverse geocoding operation was performed, resulting in geocoded data being generated. In this example, the geocoded data included a street address, city and state corresponding to the geographic coordinates in the text.

Figure 2A:
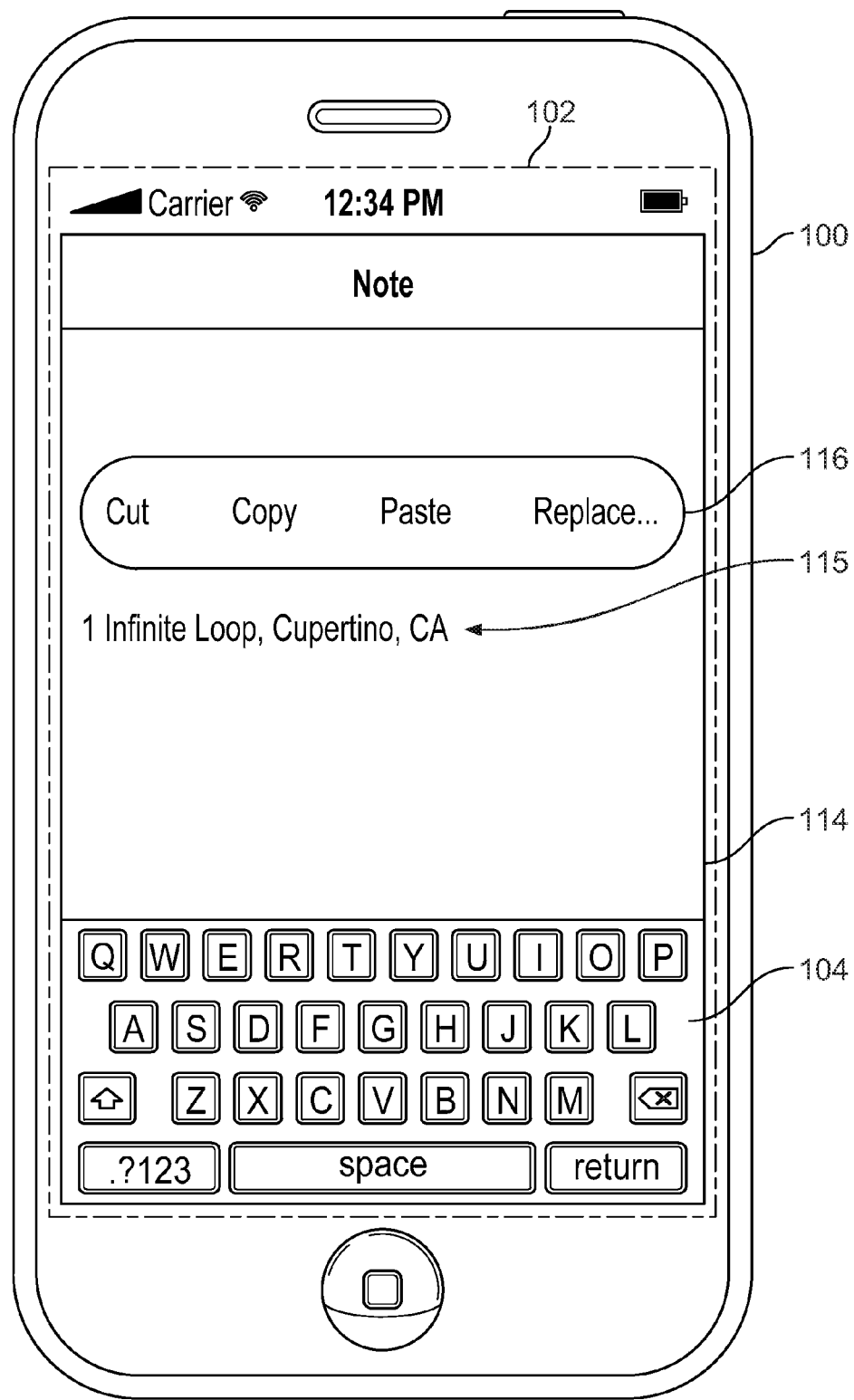
FIGS. 2A and 2B illustrate an exemplary user interface for in-place geocoding.
Figure 2B:
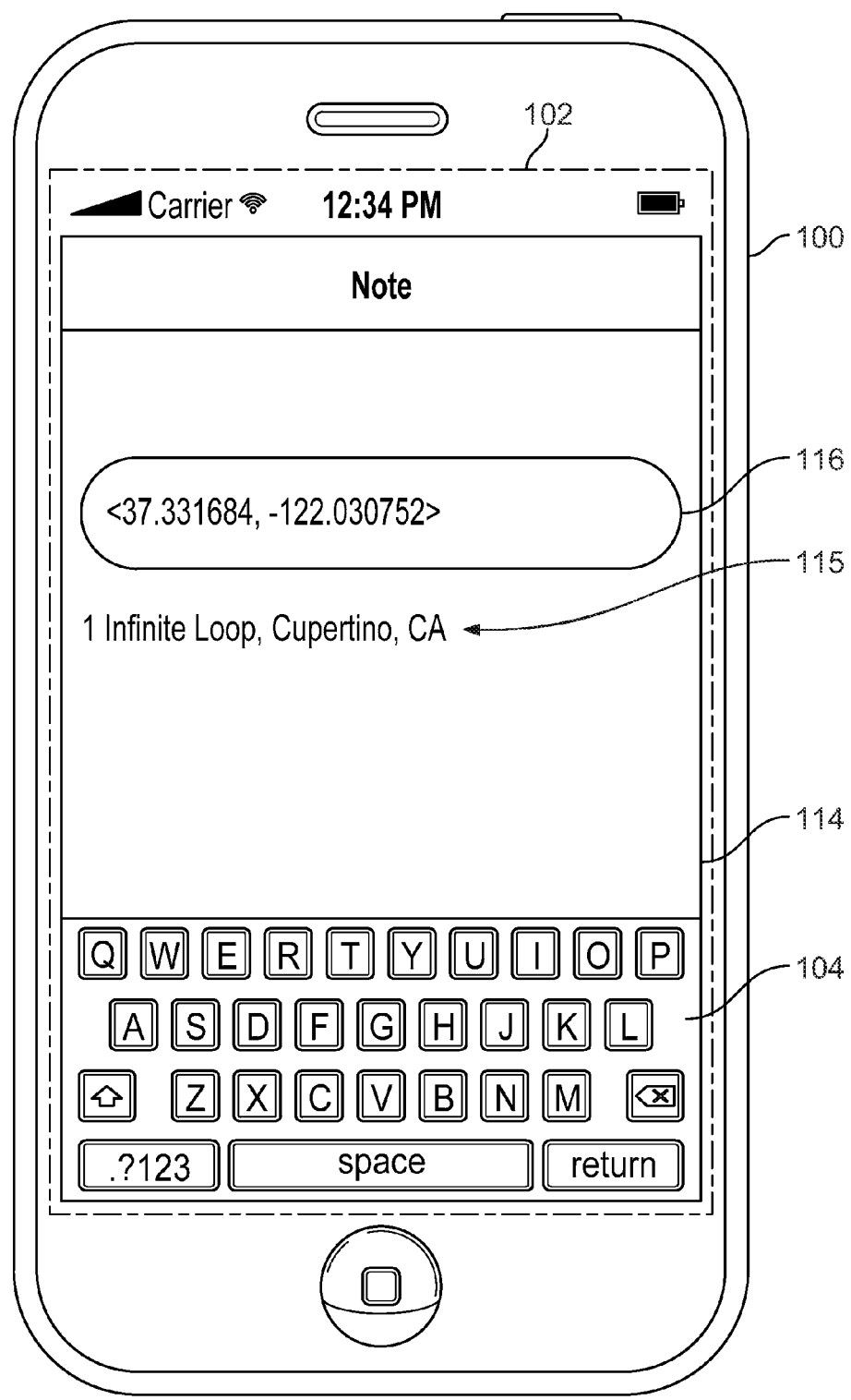

FIGS. 2A and 2B illustrate an exemplary user interface for in-place geocoding. In this example, Patrick has typed an address 115 in a notes application. Patrick touches or taps on the address to make call out 110 appear. Patrick selects the replace option and call out 110 now displays the geographic coordinates corresponding to the address, as shown in FIG. 2B.

When Patrick selected replace, a geocoding operation was performed, resulting in geocoded data including geographic coordinates corresponding to the address "1 Infinite Loop, Cupertino, Calif.," which in this example is "<37.331684, −122.030752>."

The reverse geocoding and geocoding described above can be implemented using a software geocoder that is embedded in an operating system of device 100. An example method of geocoding is address interpolation, which makes use of data from a street geographic information system (GIS), which maps a street network within a geographic coordinate space. Each street segment is attributed with address ranges (e.g. house numbers from one segment to the next). The geocoder takes an address, matches it to a street and specific segment (e.g., such as a block). The geocoder then interpolates the position of the address within the range along the segment.

Reverse geocoding can be carried out similarly to the geocoding process. For example, when geographic coordinates are entered into the geocoder a corresponding street address is interpolated from a range assigned to a road segment in a reference dataset that is nearest to the geographic coordinates. For example, if the geographic coordinates are near a midpoint of a segment that starts with address 100 and ends with 200, the returned street address will be somewhere near 150. Geographic coordinates for reverse geocoding also can be extracted from maps by geo-referencing the coordinates in a GIS with predefined spatial layers to determine the geographic coordinates.

An address/coordinate detection module in the device operating system can detect an address or geographic coordinates in text using known pattern recognition algorithms (e.g., classification algorithms, clustering algorithms, regression algorithms). The address or geographic coordinates can then be extracted from the text and sent to the geocoder without any user intervention (e.g., automatically). In addition to address and geographic coordinates, a business name can be used as input into the geocoder, which can be mapped to an address or geographic coordinates.

The output of the geocoder can be displayed in-place with the text in the originating application (e.g., e-mail, text messaging, notes, etc.) or provided to another application for display or further processing.

In some implementations, an address or partial address in the text can be refined, expanded or diminished. The detection module can use a string matching algorithm to match a partial address in text to a complete address stored in a database or other related address data. For example, the partial address "355 17$^{th}$ St" could be diminished to the corresponding city and state: "San Francisco, Calif." Also, an address could be refined to a business name. For example, the address "333 Valencia St SF Calif.," could be refined to "Joe's Cafe" or "@joescafe."

Figure 3A:
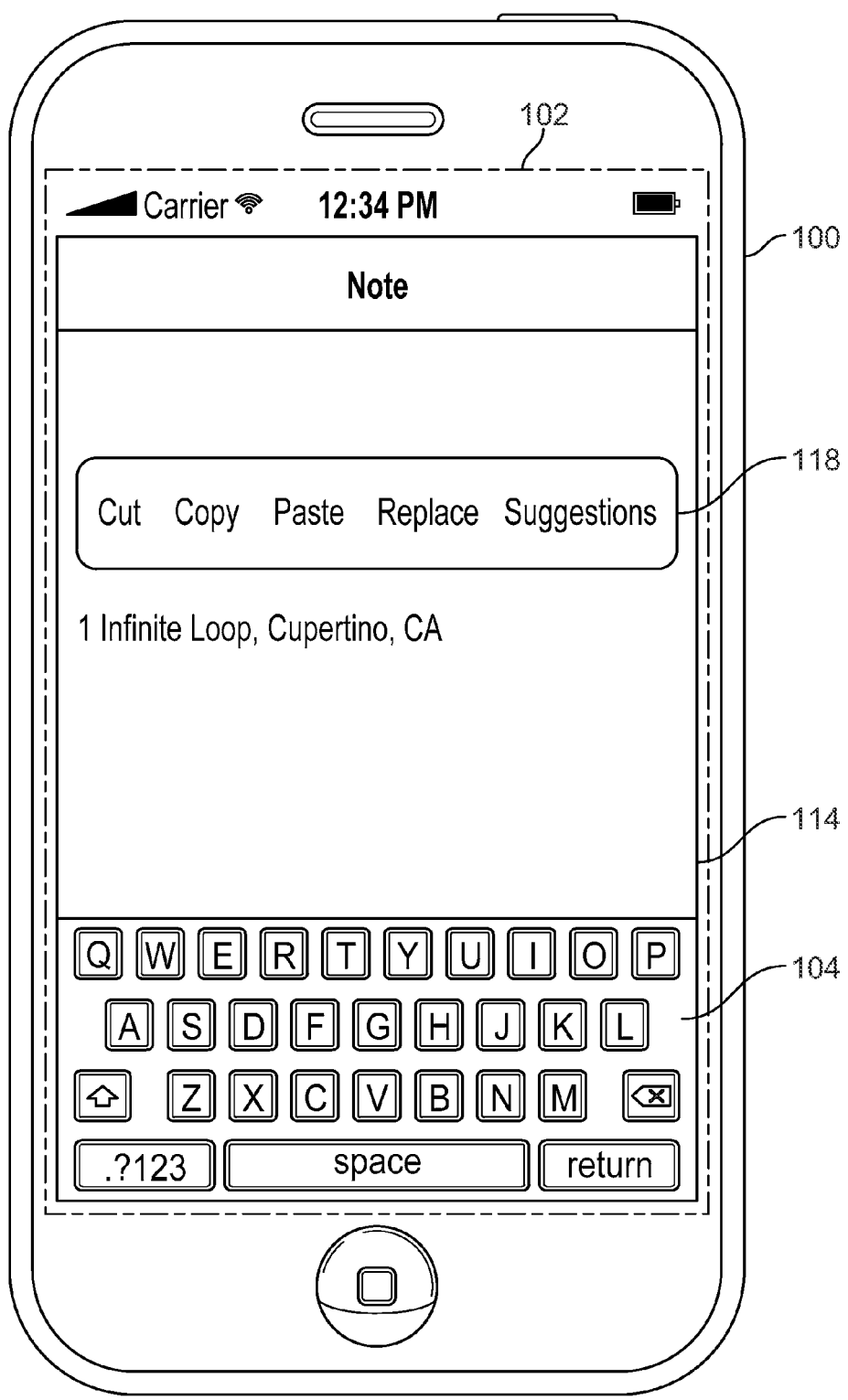
FIGS. 3A and 3B illustrate an exemplary user interface for an in-place call out for providing geocoded information.
Figure 3B:
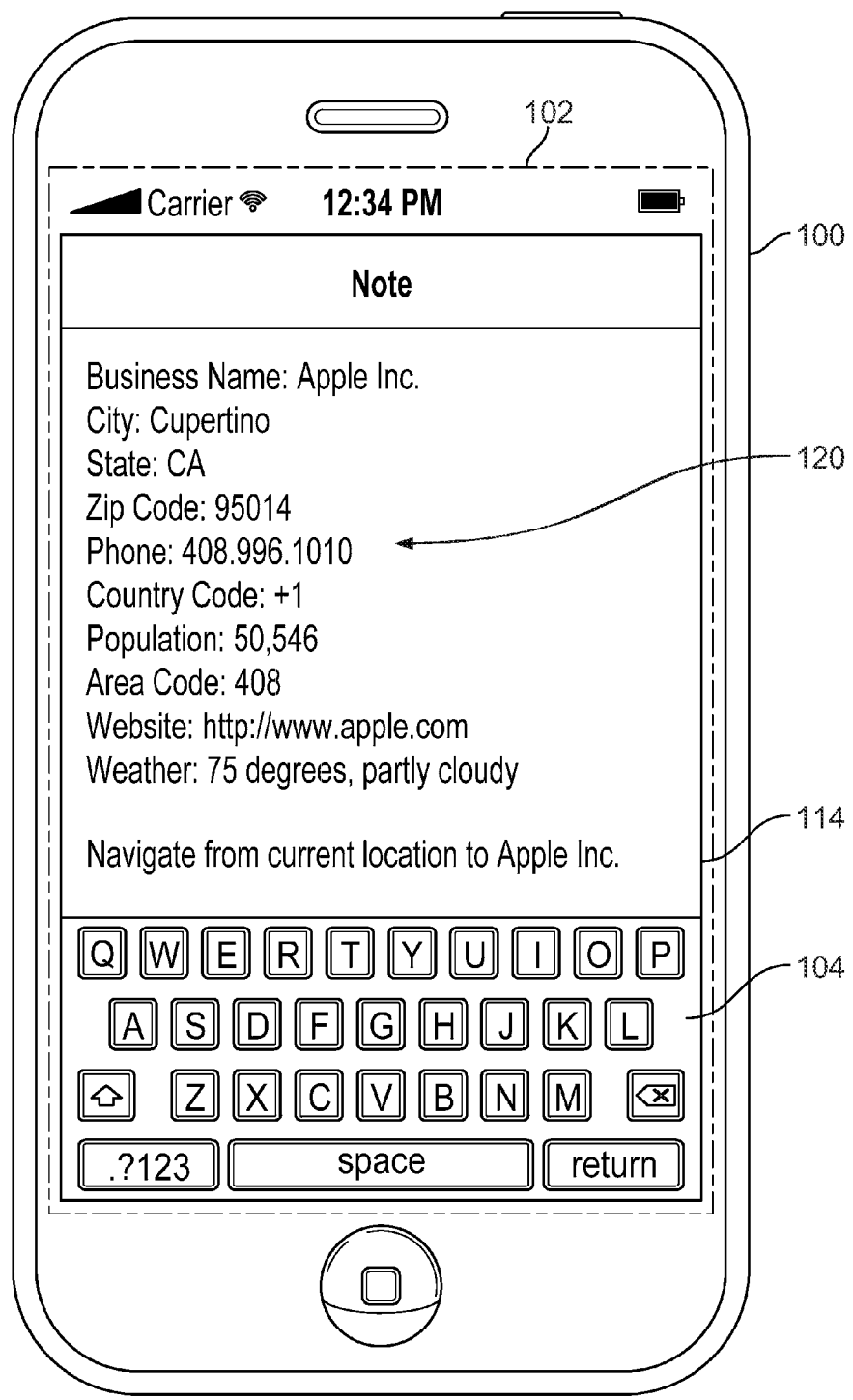

FIGS. 3A and 3B illustrate an exemplary user interface for an in-place call out for providing geocoded information. In this example, Patrick has typed an address 115 in a notes application. Patrick touches or taps on the address to make call out 118 appear. Call out 118 includes an additional option called "suggestions." Patrick selects the suggestions option and call out 118 now displays a variety of geocoded data 120 corresponding to the address, as shown in FIG. 3B. In this example, the geocoded data 120 includes a business name, city, state, zip code, phone number, country code, population, are code, website uniform resource locator (URL) and local weather conditions. The geocoded data can be stored in a local or remote map database (not shown).

In some implementations, the address is first geocoded into geographic coordinates, which are then used as an index into the map database such as a GIS. In some implementations, a network-based service can provide the geocoded data corresponding to geographic coordinates, such as service 630 shown in FIG. 6. Service 630 can also provide access to a remote database storing geocoded data.

Other geocoded data that can be provided by the geocoder can include but is not limited to: neighborhood identification data, social network information (e.g., link to launch a social network application on device), icons or symbols, oceans or other bodies of water, points of interest (e.g., parks, military bases, monuments), etc.

In some implementations, one option can be to navigate to the address or geographic coordinates. This option can use the current location of device 100 taken from, for example, an onboard positioning system (e.g., a global positioning system (GPS, a Wi-Fi™ based positioning system, or a positioning system based on a cellular network), and compute a route from the current location of device 100 to the address or geographic coordinates. A mapping application can be automatically invoked on device 100 to display a map with the computed route on display 102. In some implementations, a "street view" display of the address can be invoked automatically.

Exemplary Process

Figure 4:
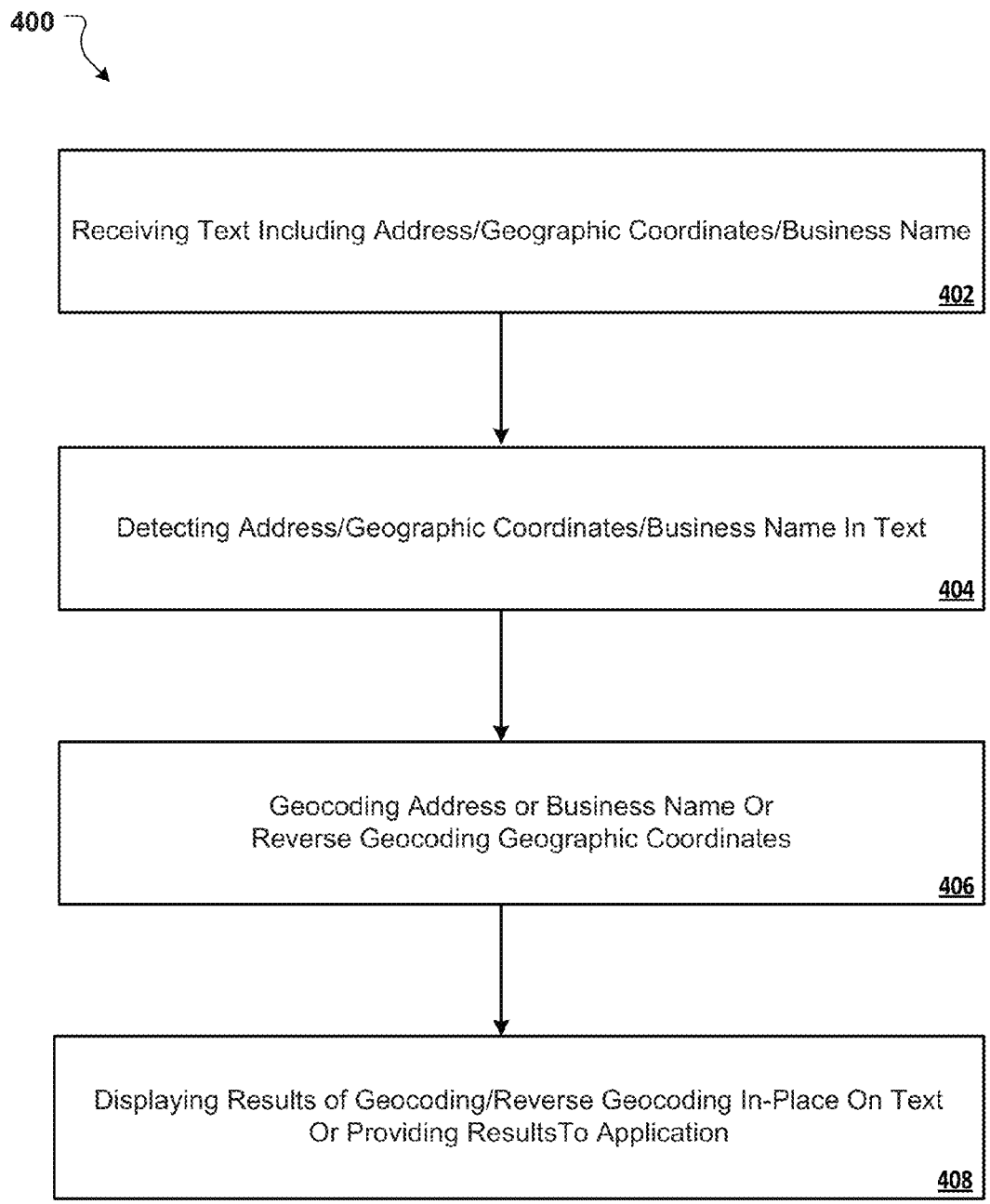
FIG. 4 illustrates an exemplary process for in-place geocoded data detection.

FIG. 4 illustrates an exemplary process 400 for in-place geocoded data detection. Process 400 can be performed using device architecture and operating environment described in reference to FIGS. 5 and 6.

In some implementations, process 400 can begin by receiving text including an address, geographic coordinates, or a business name (402). Process 400 can continue by detecting the address, geographic coordinates or business name in the text (404). The address, geographic coordinates or business name can be detected in the text using a suitable pattern-matching algorithm. Process 400 can continue by geocoding or reverse geocoding, respectively, the address/business name or geographic coordinates to produce geocoded data (406). Process 400 can continue by displaying the resulting geocoded data or reverse geocoded data in-place with the text or providing the geocoded data or reverse geocoded data to an application (408). The geocoded data can be provided by an operating system service to another application running on device 100 using, for example, an API. The geocoding/reverse geocoding can be performed on the device or by a remote network-based service.

Exemplary Device Architecture

Figure 5:
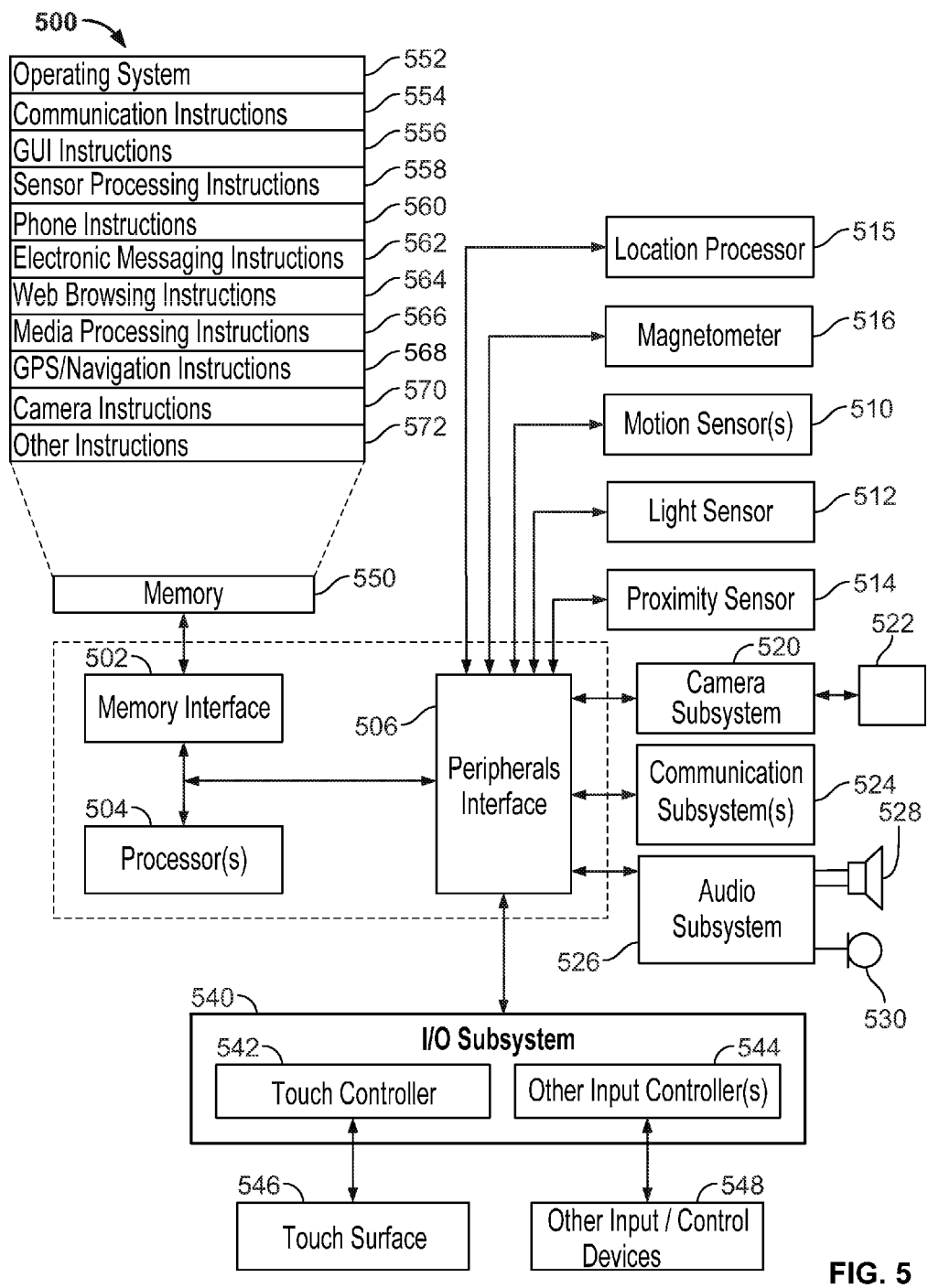
FIG. 5 is a block diagram of an exemplary architecture of a device that implements the features and processes described in reference to FIGS. 1-4.

FIG. 5 is a block diagram of an exemplary architecture of a device that implements the features and processes described in reference to FIGS. 1-4.

Architecture 500 can be implemented in any device, including but not limited to portable or desktop computers, smart phones and electronic tablets, television systems, game consoles, kiosks and the like. Architecture 500 can include memory interface 502, data processor(s), image processor(s) or central processing unit(s) 504, and peripherals interface 506. Memory interface 502, processor(s) 504 or peripherals interface 506 can be separate components or can be integrated in one or more integrated circuits. The various components described above can be coupled by one or more communication buses or signal lines.

Sensors, devices, and subsystems can be coupled to peripherals interface 506 to facilitate multiple functionalities. For example, motion sensor 510, light sensor 512, and proximity sensor 514 can be coupled to peripherals interface 506 to facilitate orientation, lighting, and proximity functions of the device. For example, in some implementations, light sensor 512 can be utilized to facilitate adjusting the brightness of touch surface 546. In some implementations, motion sensor 510 (e.g., an accelerometer, gyros) can be utilized to detect movement and orientation of the device. Accordingly, display objects or media can be presented according to a detected orientation (e.g., portrait or landscape).

Other sensors can also be connected to peripherals interface 506, such as a temperature sensor (not shown), a biometric sensor (not shown), or other sensing device (not shown), to facilitate related functionalities.

Location processor 515 (e.g., GPS receiver) can be connected to peripherals interface 506 to provide geo-positioning. Electronic magnetometer 516 (e.g., an integrated circuit chip) can also be connected to peripherals interface 506 to provide data that can be used to determine the direction of magnetic North. Thus, electronic magnetometer 516 can be used as an electronic compass.

Camera subsystem 520 and an optical sensor 522, e.g., a charged coupled device (CCD) or a complementary metal-oxide semiconductor (CMOS) optical sensor, can be utilized to facilitate camera functions, such as recording photographs and video clips.

Communication functions can be facilitated through one or more communication subsystems 524. The one or more communication subsystems 524 can include one or more wireless communication subsystems. Wireless communication subsystems 524 can include radio frequency receivers and transmitters and/or optical (e.g., infrared) receivers and transmitters. Wired communication subsystems 524 can include a port device, e.g., a Universal Serial Bus (USB) port or some other wired port connection that can be used to establish a wired connection to other computing devices, such as other communication devices, network access devices, a personal computer, a printer, a display screen, or other processing devices capable of receiving or transmitting data. The specific design and implementation of the one or more communication subsystems 524 can depend on the communication network(s) or medium(s) over which the device is intended to operate. For example, a device may include wireless communication subsystems designed to operate over a global system for mobile communications (GSM) network, a general packet radio service GPRS) network, an enhanced data GSM environment (EDGE) network, 802.x communication networks (e.g., Wi-Fi™, worldwide interoperability for microwave access (WiMAX™), or third generation (3G) networks), code division multiple access (CDMA) networks, and a Bluetooth™ network. Communication subsystems 524 may include hosting protocols such that the device may be configured as a base station for other wireless devices. As another example, the communication subsystems can allow the device to synchronize with a host device using one or more protocols, such as, for example, the transmission control protocol/internet protocol (TCP/IP), hypertext transfer protocol (HTTP), user datagram protocol (UDP), and any other known protocol.

Audio subsystem 526 can be coupled to a speaker 528 and one or more microphones 530 to facilitate voice-enabled functions, such as voice recognition, voice replication, digital recording, and telephony functions.

Input/output (I/O) subsystem 540 can include touch controller 542 and/or other input controller(s) 544. Touch controller 542 can be coupled to a touch surface 546. Touch surface 546 and touch controller 542 can, for example, detect contact and movement or break thereof using any of a number of touch sensitivity technologies, including but not limited to capacitive, resistive, infrared, and surface acoustic wave technologies, as well as other proximity sensor arrays or other elements for determining one or more points of contact with touch surface 546. In one implementation, touch surface 546 can display virtual or soft buttons and a virtual keyboard, which can be used as an I/O device by the user.

Other input controller(s) 544 can be coupled to other input/control devices 548, such as one or more buttons, rocker switches, thumb-wheel, infrared port, USB port, and/or a pointer device such as a stylus. The one or more buttons (not shown) can include an up/down button for volume control of speaker 528 and/or microphone 530.

In some implementations, device 500 can present recorded audio and/or video files, such as Moving Picture Experts Group (MPEG), MPEG-1 or MPEG-2 Layer III (MP3), or advanced audio coding (AAC) files. In some implementations, device 500 can include the functionality of an MP3 player and may include a pin connector for tethering to other devices. Other input/output and control devices can be used.

Memory interface 502 can be coupled to memory 550. Memory 550 can include high-speed random access memory or non-volatile memory, such as one or more magnetic disk storage devices, one or more optical storage devices, or flash memory (e.g., "negated and" (NAND) flash memory or "negated or" (NOR) flash memory). Memory 550 can store operating system 552, such as Darwin™, RTXC™, LINUX™, UNIX™, OS X™, WINDOWS™, Android™, iOS™, or an embedded operating system such as VxWorks™ Operating system 552 may include instructions for handling basic system services and for performing hardware dependent tasks. In some implementations, operating system 552 can include a kernel (e.g., UNIX™ kernel).

Memory 550 may also store communication instructions 554 to facilitate communicating with one or more additional devices, one or more computers or servers. Communication instructions 554 can also be used to select an operational mode or communication medium for use by the device, based on a geographic location (obtained by the GPS/Navigation instructions 568) of the device. Memory 550 may include graphical user interface (GUI) instructions 556 to facilitate graphic user interface processing, such as generating and displaying the various user interfaces and user interface elements described in reference to FIGS. 1-4; sensor processing instructions 558 to facilitate sensor-related processing and functions; phone instructions 560 to facilitate phone-related processes and functions; electronic messaging instructions 562 to facilitate electronic-messaging related processes and functions, including instructions for implementing an e-mail application or text messaging application; web browsing instructions 564 to facilitate web browsing-related processes and functions, including facilitating communication with a services 630 described in reference to FIG. 6; media processing instructions 566 to facilitate media processing-related processes and functions; GPS/Navigation instructions 568 to facilitate GPS and navigation-related processes; camera instructions 570 to facilitate camera-related processes and functions; and other instructions 572, such as instructions to implement a software geocoder and detection module as described in reference to FIGS. 1-4. The memory 550 may also store other software instructions for facilitating other processes, features and applications, such as applications related to navigation, social networking, location-based services or map displays.

Each of the above identified instructions and applications can correspond to a set of instructions for performing one or more functions described above. These instructions need not be implemented as separate software programs, procedures, or modules. Memory 550 can include additional instructions or fewer instructions. Furthermore, various functions of the mobile device may be implemented in hardware and/or in software, including in one or more signal processing and/or application specific integrated circuits.

Exemplary Operating Environment

Figure 6:
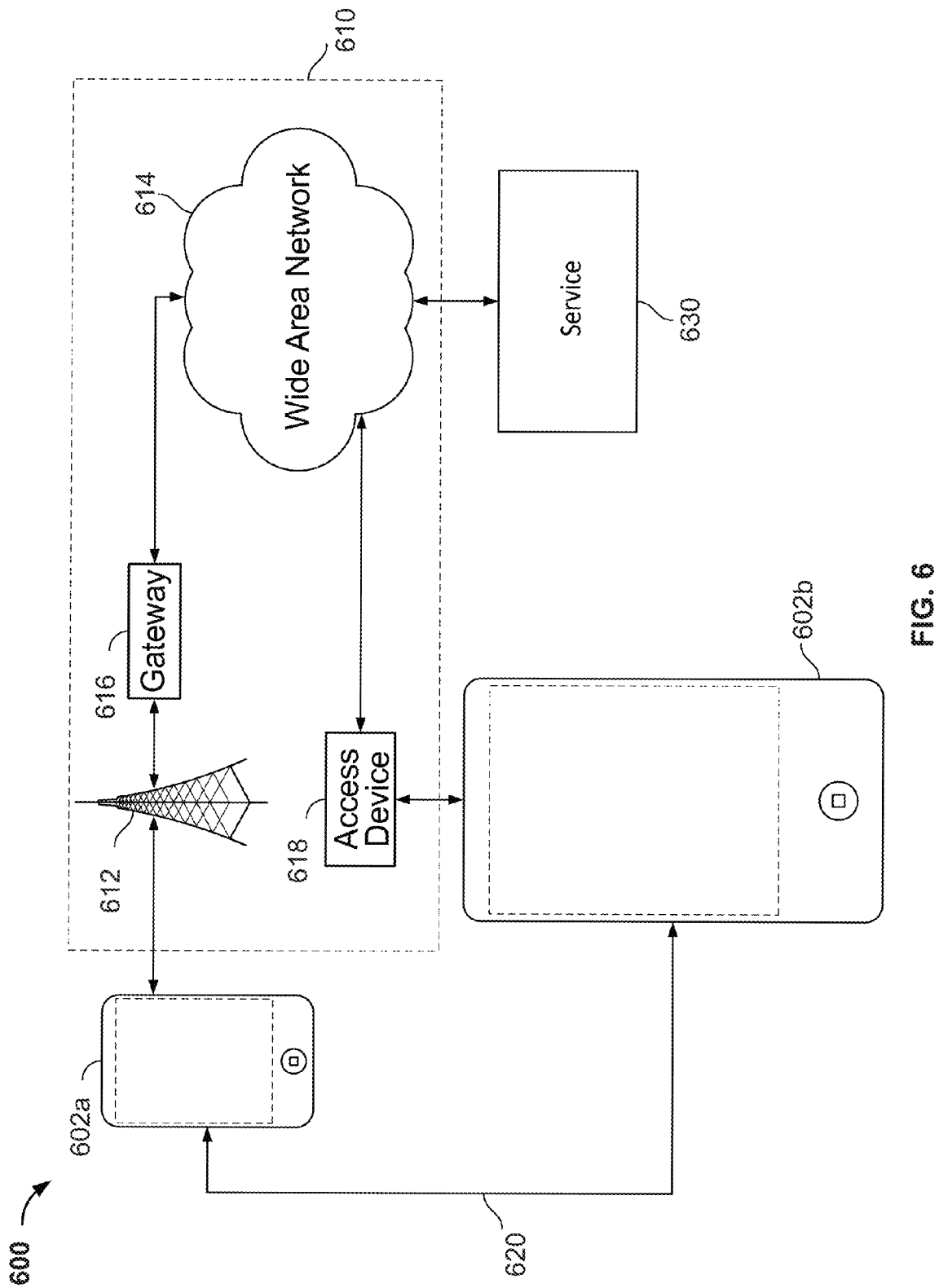
FIG. 6 is a block diagram of an operating environment for the device of FIG. 5.

FIG. 6 is a block diagram of an operating environment 600 for the device architecture described in reference to FIG. 5. In some implementations, devices 602a and 602b can communicate over one or more wired or wireless networks 610. For example, wireless network 612 (e.g., a cellular network) can communicate with a wide area network (WAN) 614 (e.g., the Internet) by use of gateway 616. Likewise, access device 618 (e.g., Institute of Electrical and Electronics Engineers (IEEE) 802.11g wireless access device) can provide communication access to WAN 614. Devices 602a, 602b can be any device capable of displaying GUIs, including but not limited to portable computers, smart phones and electronic tablets. In some implementations, the devices 602a, 602b do not have to be portable but can be a desktop computer, television system, kiosk system or the like.

In some implementations, both voice and data communications can be established over wireless network 612 and access device 618. For example, device 602a can place and receive phone calls (e.g., using voice over Internet Protocol (VoIP) protocols), send and receive e-mail messages (e.g., using simple mail transfer protocol (SMTP) or Post Office Protocol 3 (POP3)), and retrieve electronic documents and/or streams, such as web pages, photographs, and videos, over wireless network 612, gateway 616, and WAN 614 (e.g., using TCP/IP or UDP). Likewise, in some implementations, device 602b can place and receive phone calls, send and receive e-mail messages, and retrieve electronic documents over access device 618 and wide area network (WAN) 614. In some implementations, device 602a or 602b can be physically connected to access device 618 using one or more cables and access device 618 can be a personal computer. In this configuration, device 602a or 602b can be referred to as a "tethered" device.

Devices 602a and 602b can also establish communications by other means. For example, wireless device 602a can communicate with other wireless devices (e.g., other devices 602a or 602b, cell phones) over the wireless network 612. Likewise, devices 602a and 602b can establish peer-to-peer communications 620 (e.g., a personal area network) by use of one or more communication subsystems and protocols, such as Bluetooth™ communication protocol. Other communication protocols and topologies can also be implemented.

Devices 602a or 602b can communicate with service 630 over the one or more wired and/or wireless networks 610. For example, service 630 can be any service that provides webpages using a web server, including a social networking website, blog or Twitter®. Service 630 can provide geocoding/reverse geocoding services, mapping services and/or access to a database of geocoded data, as described in reference to FIGS. 1-4.

Device 602a or 602b can also access other data and content over one or more wired and/or wireless networks 610. For example, content publishers, such as news sites, Really Simple Syndication (RSS) feeds, Web sites and developer networks can be accessed by device 602a or 602b. Such access can be provided by invocation of a web browsing function or application (e.g., a browser) running on the device 602a or 602b.

Devices 602a and 602b can exchange files over one or more wireless or wired networks 610 either directly or through service 630.

The features described can be implemented in digital electronic circuitry or in computer hardware, firmware, software, or in combinations of them. The features can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer can communicate with mass storage devices for storing data files. These mass storage devices can include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as read-only memory (ROM), erasable programmable ROM (EPROM), electrically erasable programmable ROM (EEPROM), and flash memory devices; magnetic disks such as internal hard disks and removable disks; magneto-optical disks; and compact disk ROM (CD-ROM) and digital video disk ROM (DVD-ROM) disks. The processor and the memory can be supplemented by, or incorporated in, ASICs (application-specific integrated circuits).

To provide for interaction with an author, the features can be implemented on a computer having a display device such as a CRT (cathode ray tube) or LCD (liquid crystal display) monitor for displaying information to the author and a keyboard and a pointing device such as a mouse or a trackball by which the author can provide input to the computer.

The features can be implemented in a computer system that includes a back-end component, such as a data server or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network (LAN), a WAN and the computers and networks forming the Internet.

The computer system can include clients and servers. A client and server are generally remote from each other and typically interact through a network. The relationship of client and server arises by virtue of computer programs running on the respective computers and having a client-server relationship to each other.

One or more features or steps of the disclosed embodiments can be implemented using an Application Programming Interface (API). An API can define on or more parameters that are passed between a calling application and other software code (e.g., an operating system, library routine, function) that provides a service, that provides data, or that performs an operation or a computation.

The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API.

In some implementations, an API call can report to an application the capabilities of a device running the application, such as input capability, output capability, processing capability, power capability, communications capability, etc.

A number of implementations have been described. Nevertheless, it will be understood that various modifications may be made. Elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:
   receiving, by a first device, text including one or more of an address, geographic coordinates, or a business name;
   detecting, by the first device, the address, geographic coordinates or business name in the text;
   displaying a first call out user interface item, the first call out user interface item presenting the detected address, geographic coordinates, or business name;
   receiving a first user input in the first call out user interface item selecting the detected address, geographic coordinates, or business name;
   in response to the first user input, providing for display a second call out user interface item indicating that the detected address, geographic coordinates, or business name may be replaced by geocoding or reverse geocoding, the second call out user interface item including an editing option for performing a replacement action, the editing option being displayed in the second call out user interface item, the first call out user interface item and the second call out user interface item being displayed in a same view;
   receiving a second user input selecting the editing option for performing a replacement action;
   in response to the second user input:
     geocoding, by the first device, the address or business name to generate geographic coordinates or reverse geocoding the geographic coordinates to generate an address or a business name; and
     updating the second call out user interface item, including displaying a result of the geocoding or a result of the reverse geocoding in the second call out user interface item in place of the editing option;
   converting, by the first device, the received text into new text, including replacing the address or business name in the received text with the geographic coordinates of a location of the address or business, or replacing the geographic coordinates in the received text with the address or business name; and
   on the first device, displaying the new text or providing the new text to an application.

2. The method of claim 1, where the text is received from an e-mail or a text message from a second device that is different from the first device, or from a notes application executing on the first device.

3. The method of claim 1, comprising:
   displaying a third call out user interface item, the third user interface item including a spell-check user interface item or dictionary user interface item.

4. The method of claim 1, where each of the second call out user interface item and the first call out user interface item is displayed with the text.

5. The method of claim 1, where each of the geocoding and reverse geocoding is performed by an operating system service of the device according to an Application Programming Interface (API).

6. The method of claim 5, wherein the geocoding comprises retrieving geocoded data by the operating system service, where the geocoded data includes an option to compute a route from a current location of the device to the address corresponding to the geographic coordinates or an address associated with the business name.

7. A system comprising:
   one or more processors;
   memory coupled to the one or more processors and storing instructions, which, when executed by the one or more processors, causes the one or more processors to perform operations comprising:
   receiving, by a first device, text including one or more of an address, geographic coordinates or business name;
   detecting, by the first device, the address, geographic coordinates or business name in the text;
   displaying a first call out user interface item, the first call out user interface item presenting the detected address, geographic coordinates, or business name;
   receiving a first user input in the first call out user interface item selecting the detected address, geographic coordinates, or business name;
   in response to the first user input, providing for display a second call out user interface item indicating that the detected address, geographic coordinates, or business name may be replaced by geocoding or reverse geocoding, the second call out user interface item including an editing option for performing a replacement action, the editing option being displayed in the second call out user interface item, the first call out user interface item and the second call out user interface item being displayed in a same view;
   receiving a second user input selecting the editing option for performing a replacement action;
   in response to the second user input:
     geocoding, by the first device, the address or business name to generate geographic coordinates or reverse geocoding the geographic coordinates to generate an address or a business name; and updating the second call out user interface item, including displaying a result of the geocoding or a result of the reverse geocoding in the second call out user interface item in place of the editing option;

converting, by the first device, the received text into new text, including replacing the address or business name in the received text with the geographic coordinates of a location of the address or business, or replacing the geographic coordinates in the received text with the address or business name; and on the first device, displaying the new text or providing the new text to an application.

8. The system of claim 7, where the text is received from an e-mail or a text message from a second device that is different from the first device, or from a notes application executing on the first device.

9. The system of claim 7, comprising:
displaying a third call out user interface item, the third user interface item including a spell-check user interface item or dictionary user interface item.

10. The system of claim 7, where each of the second call out user interface item and the first call out user interface item is displayed with the text.

11. The system of claim 10, where each of the geocoding and reverse geocoding is performed by an operating system service of the device according to an Application Programming Interface (API).

12. The system of claim 11, wherein the geocoding comprises retrieving geocoded data by the operating system service, where the geocoded data includes an option to compute a route from a current location of the device to the address corresponding to the geographic coordinates or an address associated with the business name.

13. A non-transitory storage device storing instructions operable to cause one or more processors to perform operations comprising:
receiving, by a first device, text including one or more of an address, geographic coordinates, or a business name;
detecting, by the first device, the address, geographic coordinates or business name in the text;
displaying a first call out user interface item, the first call out user interface item presenting the detected address, geographic coordinates, or business name;
receiving a first user input in the first call out user interface item selecting the address, geographic coordinates or business name;
in response to the first user input, providing for display a second call out user interface item indicating that the address, geographic coordinates or business name may be replaced by geocoding or reverse geocoding, the second call out user interface item including an editing option for performing a replacement action, the editing option being displayed in the second call out user interface item, the first call out user interface item and the second call out user interface item being displayed in a same view;
receiving a second user input selecting the editing option for performing a replacement action;
in response to the second user input:
geocoding, by the first device, the address or business name to generate geographic coordinates or reverse geocoding the geographic coordinates to generate an address or a business name; and
updating the second call out user interface item, including displaying a result of the geocoding or a result of the reverse geocoding in the second call out user interface item in place of the editing option;
converting, by the first device, the received text into new text, including replacing the address or business name in the received text with geographic coordinates of a location of the address or business, or replacing the geographic coordinates in the received text with the address or the business name; and
on the first device, displaying the new text or providing the new text to an application.

14. The non-transitory storage device of claim 13, wherein the text is received from an e-mail or a text message from a second device that is different from the first device, or from a notes application executing on the first device.

\* \* \* \* \*